United States Patent [19]

Laman

[11] 4,208,678
[45] Jun. 17, 1980

[54] STABILIZED ROTATION OF FLEXIBLE DISK FILES

[75] Inventor: William H. Laman, Tucson, Ariz.

[73] Assignee: International Business Machines Corporation, Armonk, N.Y.

[21] Appl. No.: 947,389

[22] Filed: Oct. 2, 1978

[51] Int. Cl.$^2$ ............................................. G11B 17/00
[52] U.S. Cl. ..................................... 360/71; 360/102; 360/99; 360/137
[58] Field of Search ............... 360/71, 73, 102, 97–99, 360/137, 133; 236/92 R; 137/85, 468

[56] References Cited

U.S. PATENT DOCUMENTS

| | | | |
|---|---|---|---|
| 3,110,889 | 11/1963 | Morley et al. | 360/102 |
| 3,140,047 | 7/1964 | Holloway | 137/85 X |
| 3,208,056 | 9/1965 | Pearson et al. | 360/99 |
| 4,030,136 | 6/1977 | Smith et al. | 360/98 |

FOREIGN PATENT DOCUMENTS 632132  7/1936  Fed. Rep. of Germany ........ 236/92 R

OTHER PUBLICATIONS

I.B.M./T.D.B., vol. 20, No. 5, Oct. 1977, pp. 1891–1892, "Atmospheric Pressure Compensator for Disk Files", by Wheeler.
I.B.M./T.D.B., vol. 20, No. 3, Aug. 1977, pp. 914–915, "Disk Selector . . .", by Kleczkowski et al.
I.B.M./T.D.B., vol. 20, No. 2, Jul. 1977, pp. 506–507, "Flexible Disk Selections", by Kleczkowski et al.
I.B.M./T.D.B., vol. 19, No. 5, Oct. 1976, pp. 1882–1883, "Shrouded Flexible Disk Pack", by Talke.

Primary Examiner—John H. Wolff
Attorney, Agent, or Firm—Herbert F. Somermeyer

[57] ABSTRACT

A stack of co-rotating flexible record storage disks is stabilized by maintaining mass flow of stabilizing air within a predetermined range. In a preferred form, mass flow is maintained by sensing both barometric and thermal changes and adjusting the mass flow of the stabilizing air in accordance with such sensed parameters.

7 Claims, 3 Drawing Figures

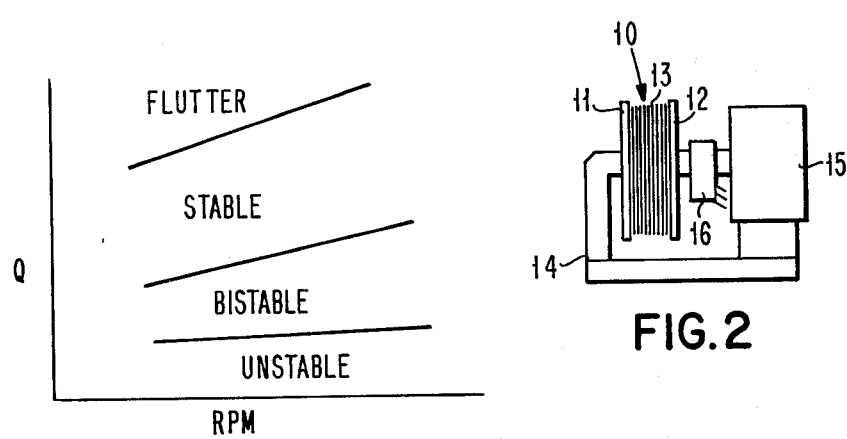
FIG. 1
FIG. 2
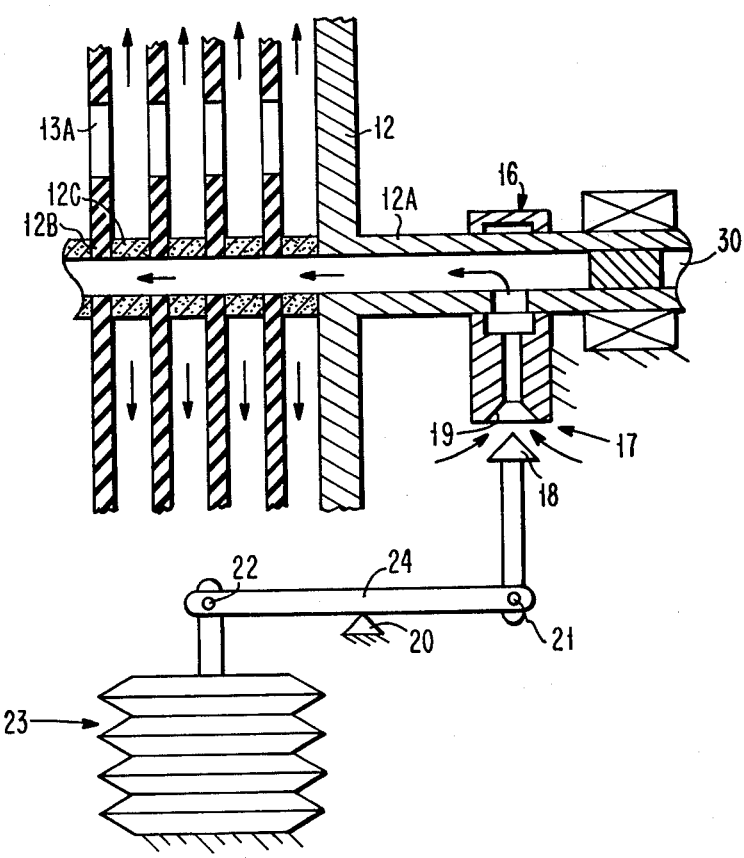
FIG. 3

STABILIZED ROTATION OF FLEXIBLE DISK FILES

BACKGROUND OF THE INVENTION

The present invention relates to enhanced stabilization of co-rotating stacks of flexible record storage disks.

A co-rotating stack of record disks is generally stabilized by circumferentially uniform radially outwardly flowing air. Such stabilization is achieved either by self-ventilation characterized by apertured flexible record storage disks or by a separate pump for supplying air through a tubular spindle to interstices between the adjacent storage disks. It is also known that the access openings for transducer access is a function of the air flow and rotational speed of the record storage disk. Referring to FIG. 1, the ordinance represents a mass of air flow whereas the abscissa represents the rotational speed of the record storage disk. In prior analyses the mass flow shown in FIG. 1 was listed as a function of pressure in the tubular spindle. The operation of the stack of disks with pressure in accordance with the prior art includes an unstable area at extremely low pressure wherein the adjacent record storage disk could come into contact or take unpredictable axial relationships with each other. In a bistable region the disk could be side by side in parallel relationship or could be axially spaced apart similar to a transducer access opening. In fact, several storage apparatus employing a stack of co-rotating flexible storage disks are purposely pressured through the bistable range such that a mechanical or fluidic agitation of the disk can create a transducer access opening. Above the bistable range there is a stability range in which the co-rotating disks are generally always in parallel relationship. Above the stable range is a flutter range. It should be appreciated that the line separating the ranges are not point discontinuities but the whole range is a continuum of parameter changes.

It is desired to impart certain operational characteristics to such storage apparatus. Such operational characteristics require fast access openings and closings. To this end, the lower portion of the bistable range, i.e. adjacent the unstable range, is characterized by a rapid opening. However, it is plagued with slow closing. On the other hand, the upper end of the bistable range is characterized by fast closing and plagued by slow opening. Other parameters not pertinent to the understanding of the present invention affect flexible disk operations indicating that the range of operation of the stack of flexible disks should be restricted to a relatively narrow range of operation such that the design parameters of such record storage apparatus can be more readily achieved.

Such record storage apparatus operates under a wide variety of environmental conditions. For example, altitude changes as well as local weather pressure changes, also termed barometric changes, can have a substantial adverse or advantageous affect on disk stack operations. Further, temperature changes—particularly high temperature changes—tend to degrade disk stack operations. What is needed is a control mechanism and method for ensuring that the stack of co-rotating flexible storage disks are maintained in a narrow range of stabilizing operations.

SUMMARY OF THE INVENTION

It is an object of the present invention to provide enhanced control of stability for a stack of co-rotating flexible storage disks which are stabilized by radially outward air flow between adjacent ones of such disks.

A method of employing the present invention includes rotating the disk in unison and simultaneously generating the predetermined radially outward air flow between adjacent ones of such disks. The mass of such generated air flow is sensed and is adjusted in accordance with such sensing to maintain the mass of air flow with any predetermined range whereby the operating characteristics of such stack of co-rotating flexible storage disks is maintained within a preselected range of operations. In a preferred form of the invention, a unitary flow control is responsive to a separate barometric and temperature sensor mechanism for adjusting the air flow, thereby adjusting the mass of air flow. In a specific form of the invention, the mass flow adjustment is a needle valve which adjusts the main flow of air through the stack of co-rotating disks. In the alternative, the needle valve may be a bleeder valve for bleeding air from the flow for maintaining the mask at a relatively constant magnitude.

THE DRAWING

FIG. 1 is a graphical representation of variation of disk stack rotational stability as measured against mass of air flow with respect to rotational speed.

FIG. 2 is a diagrammatic showing of a record storage apparatus with which the present invention may be advantageously employed.

FIG. 3 is a diagrammatic illustration of one incorporation of the invention into the FIG. 2 illustrated apparatus.

DETAILED DESCRIPTION

Referring now more particularly to the drawing. Like numerals indicate like parts and structural features in the various figures. A record storage apparatus 10 consists of a storage media assembly (SMA) 11, 12, 13 including a pair of spaced rigid stabilizing end plates 11, 12 joining a plurality of flexible record storage disks 13. The SMA 11-13 is suitably mounted for rotation on a frame 14. A motor 15 on frame 14 rotates the SMA as a unitary member. For maintaining the stability of the flexible record storage disk 13 a mass air flow controller 16 is added to the FIG. 2 illustrated apparatus.

FIG. 1 illustrates the operation of the FIG. 2 illustrated apparatus and as described in the background of the invention. As mentioned, prior art teaches that the control of stability should be with pressure rather than with mass flow. It has been found however that at certain extreme operating conditions ideal stability was not achieved. That is, at altitudes above 7,000 feet and temperatures exceeding 100° the stability of the record storage disk 13 became questionable. This problem is completely obviated by the present invention in that, rather than controlling pressure inside a tubular spindle, the mass of air flow into the spindle is controlled. This means that the pressure will vary as opposed to keeping a constant pressure. Such pressure variation will accommodate a constant mass flow as will become apparent.

A better understanding of the invention is achieved by referring to FIG. 3 wherein end plate 12 is shown as having an axially extending tubular spindle portion 12A on which is mounted mass air flow controller 16. Tubular spindle 12A rotates within controller 16 by bearings (not shown) and is in fluid communication with a mass air flow controlling valve 17.

Air enters the assembly through valve 17 thence through the center portion of tubular spindle portion 12A and thence to tubular spindle portion 12B supporting storage disk 13. From thence, stabilizing air flow moves radially outwardly as indicated by the plurality arrows between disk 13. Tubular spindle portion 12B consists of a lamination of the disk 13 themselves, plus a plurality of spacers 12C which are permeable to air for allowing circumferentially uniform radially outward air flow, indicated by the arrows between disk 13. The illustrated embodiment of FIG. 3 is a self-vented type—i.e., the rotation of the disks 13 themselves induce the stabilizing air flow. This is achieved by providing each of the disks 13 with a plurality of circumferentially spaced apart air venting apertures 13A. Apertures 13A are preferably close to the tubular spindle 12B and radially inside the record area of the disk (not shown). In the alternative, a pump can supply pressurized air through either end or both ends of the tubular spindle 12A, 12B.

To control the mass of air flow, air controller 16 valve 17 is responsive to a pair of sensors 23, 24 which sense the mass of air flow entering the valve 17. This is achieved by the aneroid type bellows 23 which is responsive to the ambient barometric pressure in which the storage apparatus 10 resides. That is, as the ambient pressure reduces, bellows 23 expand. For increasing the opening of valve 17 the arm 24 is bimetallic and therefore is responsive to temperature changes in the ambience of record storage apparatus 10. The bimetal strip is chosen such that, as temperature is increased, valve 17 opens more. The coaction of the sensors 23, 24 also are valve actuators as will become apparent. Temperature sensor 24 also acts as a lever for transmitting the motion of bellows 23 to valve 17 via pivots 22, 21 and six pivot 20. Pivot 20 is suitably mounted on plane 14, as is bellows 23. Such compound sensing and actuation adjusts the position of needle 18 with respect to valve seat 19. As temperature and pressure variations increase the mass of air in the environment of record storage apparatus 10, valve 17 is closed for reducing the volume of air and therefore reducing the mass of air flowing through tubular spindle 12A, 12B. Similarly, as the temperature and pressure variations reduce the mass of the air surrounding record storage apparatus 10, valve 17 is automatically opened for maintaining the actual mass of air flow the same. Note that the volume will change as the valve 17 is adjusted in accordance with temperature and pressure.

Valve 17 instead of being an inlet valve can be a bleeder valve. For example, an air pump (not shown) can be in clear communications with open end 30 of tubular spindle 12A. Then the air pump can supply constant pressure air to the inside of tubular spindle 12A. Valve 17 then will bleed air from tubular spindle 12A for maintaining the mass of air flow to the disk 13 at a relatively constant value. It should be noted that in the self-venting embodiment, end 30 of the tubular spindle 12A is sealed.

While the invention has been particularly shown and described with reference to a preferred embodiment thereof, it will be understood by those skilled in the art that various changes in form and details may be made therein without departing from the spirit and scope of the invention. The term "air" is intended to include any gaseous fluid, not just environmental air. That is, the storage unit could be sealed; then the invention would accommodate any changes due to leakage and the like.

What is claimed is:

1. The method of operating a record storage apparatus having a plurality of spaced co-rotating flexible record storage disks with means for enabling fluid communication from a tubular support spindle to axial spaces between each of said record storage disks, the steps of:

rotating said disks in unison and generating a predetermined outward radial air flow of a given mass from said tubular support spindle through said axial spaces;

sensing air temperature and pressure adjacent said storage apparatus for enabling control of the mass of air flow through said storage apparatus; and adjusting said mass of air flow to a substantially constant predetermined level in accordance with said sensing whereby rotational stability of said disks is maintained.

2. The method set forth in claim 1 further including continuously sensing said mass of air flow and continuously adjusting said mass of air flow in accordance with said sensed mass of air flow.

3. A record storage apparatus including a plurality of co-rotating, co-axial, flexible storage disks mounted for rotation on a tubular spindle and having means for providing fluid communication from said tubular spindle to spaces between said co-rotating disks, the improvement including in combination:

a mass air flow controller in fluid communication with said tubular spindle;

means for sensing air temperature and pressure adjacent said storage apparatus for enabling control of the mass of air flow through said tubular spindle; and control means connecting said sensing means to said controller for adjusting the mass of air flow in accordance with said sensed temperature and pressure whereby mass of air flow inside said tubular spindle is regulated to a relatively constant magnitude.

4. The storage apparatus set forth in claim 3 wherein said sensing means includes pressure responsive means and temperature responsive means connected in common, whereby said sensing is cumulative and means in said mass flow controller responsive to said cumulative sensing to alter the mass flow in accordance therewith.

5. The apparatus set forth in claim 4 wherein said control means includes a valve having a movable member for adjusting the said valve between more open and more closed positions, a pivot means in said control means;

a temperature responsive means being pivoted on said pivot means; linkage means connecting said movable member and to said temperature responsive means, second linkage means connecting said temperature responsive means to said pressure responsive means, and said pressure responsive means being supported with said pivot means.

6. The apparatus set forth in claim 5 wherein said stack of disks is self-ventilated and said mass flow controller controls the entire flow to said stack of disks, and including:

means co-axial with said tubular spindle for supplying said air thereto and said valve being radially displaced outwardly along one radial line from said tubular spindle.

7. Record storage apparatus including a plurality of spaced apart co-rotatable flexible storage disks mounted for rotation on a tubular spindle, said tubular spindle adapted to receive air for transmission past said flexible disk, thereby stabilizing same,
   the improvement including in combination:
   means in fluid communication with said tubular spindle for adjusting the mass flow of air therethrough, said means including valve means including an actuatable movable member;
   a temperature sensing bimetallic element secured to one end of said actuatable movable member
   pivot means pivotably supporting said bimetallic element; and
   pressure responsive means fixed to said pivot means and having a free end portion pivotably connected to said temperature sensing means opposite said first mentioned pivotable connection whereby said fixed pivot means is intermediate said pivotable connection.

* * * * *